UNITED STATES PATENT OFFICE.

EDWARD GOODRICH ACHESON, OF STAMFORD TOWNSHIP, ONTARIO, CANADA.

PRODUCTION OF GRAPHITE.

No. 836,355.  Specification of Letters Patent.  Patented Nov. 20, 1906.

Application filed September 22, 1906. Serial No. 335,750.

*To all whom it may concern:*

Be it known that I, EDWARD GOODRICH ACHESON, a citizen of the United States, residing in Stamford township, in the county of Welland, Province of Ontario, Canada, have invented certain new and useful Improvements in the Production of Graphite, of which the following is a specification.

This invention relates to the production of graphite from carbonaceous materials—such as mineral coal, coke, petroleum-coke, and the like—the object of the invention being to provide a method whereby carbonaceous material may be converted into a soft, smooth, unctuous, and non-coalescing graphite suitable for lubrication, electrotyping, for use as a stove-polish, and for other purposes.

It is well understood in the art that the term "graphite" includes a number of more or less sharply-distinguishable varieties differing in their physical characteristics and in certain chemical respects—as, for instance, in their resistance to oxidation. All of said varieties, however, possess the property of yielding under the influence of certain oxidizing agents the compound known as "graphitic oxid."

I have heretofore described several methods whereby carbon may be transformed into graphite. Thus in my prior patent, No. 568,323, granted September 29, 1896, I have disclosed a method wherein graphite is produced by electrically subjecting a carbid to a temperature sufficiently high to drive off and volatilize the non-carbon constituent and separate the combined carbon in the form of graphite. The graphite so produced is very pure, soft, and unctuous, but possesses the characteristic of coalescing into masses under pressure, this property rendering it unadapted for use as a lubricant, a stove-polish, or for electrotyping.

According to my prior patent, No. 617,979, granted January 17, 1899, articles of graphite are produced by forming the articles from a mixture of carbon and carbid-forming material and then subjecting them to a temperature sufficiently high to form and then decompose a carbid. As specifically described in said patent, a comparatively very small percentage of carbid-forming material was used, and the observed effect of such small percentage in converting much larger percentages of carbon was attributed to an action involving the progressive formation and decomposition of a carbid. The articles formed in accordance with this method will produce a shining mark on paper, but are, comparatively speaking, hard graphite and not of the soft and unctuous character now contemplated.

According to the method described in my prior patent, No. 645,285, granted March 13, 1900, graphite is produced by heating a carbonaceous material containing inherent carbid-forming impurities and specifically by heating a non-caking coal, the peculiar characteristics of the product obtained being attributed to the substantially uniform distribution of the impurities. The graphite produced by this method is usually comparatively hard, but is well suited for such purposes as dry-battery fillers, pigments, and the like. In some instances, however, a coal containing a relatively small proportion of ash has been found to yield a soft and unctuous graphite.

According to the method described in my prior patent, No. 711,031, granted October 14, 1902, graphite of a more or less unctuous character is made by causing vapors of a carbid-forming material to act upon carbon at a high temperature, this effect being produced by heating in an electric furnace a mass of carbon, a relatively small amount of carbid-forming material, such as oxid of iron, having been mixed with the said carbon, to an extremely high temperature, whereby the oxid of iron is reduced and the vapor of the iron reacts upon the associated carbon, converting it into a more or less soft graphite. It is not possible by this method to commercially produce the soft unctuous product now contemplated, as a continual loss of the metallic vapor occurs, and it is entirely dissipated before the desired effect is produced.

I have now discovered that a pure, soft, and unctuous graphite which will not coalesce under pressure may be produced by heating in an electric furnace a charge comprising, essentially, carbonaceous material—such as mineral coal, coke, petroleum-coke, and the like—and one or more carbid-forming materials, such carbid-forming material being in excess of the proportion of natural ash contained in any coal, but in less than the theoretical proportion required for the production of a carbid—that is, the carbon is present in greater proportion than is required to reduce the metallic compound or carbid-forming material and to combine with the base thereof with formation of a carbid.

One specific example of my process is as follows: An electric furnace having a length of eighteen feet between terminal electrodes was provided with a starting-core consisting of a graphite rod seven-eighths of an inch in diameter. The active zone eighteen inches in diameter surrounding this core was filled with a mixture of carbonaceous material and carbid-forming oxid. The materials used in this specific instance were anthracite coal ground to pass through a one-fourth inch mesh, mixed with sand, in the proportions of sixty-five per cent. coal and thirty-five per cent. sand, the ash contained in the coal being calculated as a part of the sand content of the mixture. Completely surrounding the active zone above referred to was disposed a mixture of anthracite coal and sand in the proportion of one part of coal to two parts of sand, this mixture having a much higher electrical resistance than that in the active zone and serving as an effective heat-retainer. The furnace being charged in this manner, the electric current was turned on and at the beginning registered seventy-nine volts and seventy-five kilowatts. After two hours the register showed two hundred and three volts and two hundred kilowatts, and after nine and a half hours showed one hundred and thirty-five volts and eight hundred kilowatts. The register at the end of fifteen hours still showed eight hundred kilowatts, while the volts had dropped to seventy as the result of decreased internal resistance due to the formation of graphite. When cold, the furnace was opened and nine hundred and sixty-two pounds of soft, unctuous, and non-coalescing graphite were removed from the active zone.

As the carbid-forming material I prefer to use silica or a mixture consisting largely of silica, for the reason that oxids which form fluid carbids are more or less difficult of treatment in an electric furnace. I do not limit myself, however, to the use of silica or to the use of mixture consisting largely of silica. The natural ash of the coal contains more or less alumina, and I have found it satisfactory to consider this alumina as the equivalent of an equal amount of silica. In practice I determine the carbon content of the mixture and treat the remainder, regardless of its nature, as silica or carbid-forming ash.

I do not limit myself to the specific proportions given in the foregoing example, as I have found that these may be considerably varied and still yield a satisfactory product having the essential characteristics above stated. I believe it to be essential, however, that the carbid-forming ingredient should be in excess of twenty per cent., by weight, of the charge, but in less than the theoretical proportion required for the production of a carbid, and I prefer that the carbid-forming material should constitute approximately thirty to forty-five per cent., by weight, of the charge.

I claim—

1. The method of making soft unctuous and non-coalescing graphite, which consists in heating in an electric furnace a charge comprising, essentially, carbonaceous material and carbid-forming material, said carbid-forming material being in excess of twenty per cent. by weight of the charge, but in less than the theoretical proportion required for the production of a carbid.

2. The method of making soft unctuous and non-coalescing graphite, which consists in heating in an electric furnace a charge comprising, essentially, carbonaceous material and carbid-forming material, said carbid-forming material being in the proportion of thirty to forty-five per cent. by weight of the charge.

In testimony whereof I affix my signature in presence of two witnesses.

EDWARD GOODRICH ACHESON

Witnesses:
H. B. BODINE,
FRANK N. COE.